United States Patent [19]

Suzuki et al.

[11] Patent Number: 5,502,590
[45] Date of Patent: Mar. 26, 1996

[54] HARMONIC WAVE GENERATING ELEMENT FOR COHERENT LIGHT HAVING SHORT WAVELENGTH

[75] Inventors: Kazuo Suzuki, Tokyo; Yukihiro Yamamoto, Kawasaki, both of Japan

[73] Assignee: Nippon Steel Corporation, Tokyo, Japan

[21] Appl. No.: 254,581

[22] Filed: Jun. 6, 1994

[30] Foreign Application Priority Data

Jun. 8, 1993 [JP] Japan .................................. 5-164017
Mar. 28, 1994 [JP] Japan .................................. 6-081006

[51] Int. Cl.⁶ ...................................................... G02F 1/37
[52] U.S. Cl. .......................... 359/332; 359/328; 385/122
[58] Field of Search ...................... 385/122; 359/326–332

[56] References Cited

U.S. PATENT DOCUMENTS

| | | | |
|---|---|---|---|
| 4,856,860 | 8/1989 | Silberberg et al. | 385/122 |
| 4,896,933 | 1/1990 | Yano et al. | 359/328 |
| 5,036,220 | 7/1991 | Byer et al. | 359/328 |
| 5,046,817 | 9/1991 | Uenishi et al. | 359/328 |
| 5,249,191 | 9/1993 | Sawaki et al. | 385/122 X |
| 5,323,262 | 6/1994 | Mizuuchi et al. | 359/332 |
| 5,339,190 | 8/1994 | Yamamoto et al. | 359/332 |

OTHER PUBLICATIONS

"Optical Second Harmonic Generation In Form Of Coherent Cerenkov Radiation From A Thin–Film Waveguide", Appl. Phys. Let., vol. 17, No. 10 Nov. 15, 1970, Tien et al., pp. 447–450.

"Phase–matchable Nonlinear Optical Interactions In Periodic Thin Films", Appl. Phys. Lett., vol. 21, No. 4, Aug. 15, 1972, Somekh et al., pp. 140–141.

"Balanced Phase Matching In Segmented KTiOPO₄ Waveguides", Appl. Phys. Lett., vol. 56, No. 18, Apr. 30, 1990, Bierlein et al., pp. 1725–1727.

Hikari Tuushin Yooran, Survey of Optical Transmission, Hirayama et al., Kagaku Shinbunsha (1984) pp. 226–241, (no month).

*Primary Examiner*—John D. Lee
*Attorney, Agent, or Firm*—Pollock, Vande Sande & Priddy

[57] ABSTRACT

A harmonic wave generating element of a discrete structure for reducing loss of light caused by scattering and improving efficiency of conversion has a polarization-inverted portion and a non-inverted portion periodically formed in a non-linear optical material to perform quasi phase matching between incident light and an n-th harmonic wave and to form a discrete optical waveguide structure, in which the boundary between the polarization-inverted portion and the non-inverted portion has a generally curved surface. And a waveguide structure is formed in the non-linear optical material and provides a mechanism for generating n-th harmonic wave and a lens-like focusing mechanism for facilitating the optical coupling of light at an end surface of incidence.

9 Claims, 11 Drawing Sheets

AXIAL DEVIATION OF INCIDENT LIGHT (μm)

HARMONIC WAVE GENERATING ELEMENT FOR COHERENT LIGHT HAVING SHORT WAVELENGTH

CROSS-REFERENCES TO RELATED APPLICATIONS

This application relates to U.S. Ser. No. 08/047,183 entitled "OPTICAL WAVEGUIDE SECOND HARMONIC GENERATING ELEMENT AND METHOD OF MAKING THE SAME" being filed by Yukihiro Yamamoto and assigned to the present assignee, now U.S. Pat. No. 5,339,190, based on Japanese Application No. 4-122773 filed on Apr. 16, 1992 and the contents of which are incorporated herein by reference.

BACKGROUND OF THE INVENTION

1. Field of the Invention

The present invention relates to a harmonic wave generating element for obtaining a coherent light having short wavelength by converting an output light from a stable light source for a high-power coherent light as a laser into a coherent light of its harmonic wave having a half or shorter wavelength of the output light.

2. Description of the Related Art

In order to obtain a harmonic wave generating element, for example, a second harmonic generating element (SHG) with a high conversion efficiency, it is important that the phase of incident light and the phase of generated SHG light are matched within the element. In the case of a bulk element, the phase matching is made by adjusting the angle of SHG crystal with respect to the optical axis using anisotropy of refractive index of SHG crystal.

Also, a method of enhancing intensity of light by use of a waveguide structure is employed in order to improve efficiency of SHG generation. Since conversion efficiency of harmonic wave generating element becomes high in proportion to intensity of light in the element, the light intensity can be enhanced by waveguide structure converging light in the element. Various methods for phase matching in a waveguide structure have been proposed. Practical ones of those methods include a method using Cherenkov radiation disclosed by P. K. Tien et al. in Appl. Phys. Lett., 17 (1970), 447 and a method for obtaining a quasi phase matching by a periodic structure disclosed by S. Somekh et al. in Appl. Phys. Lett., 21 (1972), 140, for example. The former method has a simple waveguide structure however, it requires a complicated optical for converging light since SHG light is generated radially with a fixed angle with respect to the waveguide. On the other hand, the latter method has a complicated structure and requires a long fabrication process light can easily be converged since SHG light is propagated according to a waveguide mode.

In the quasi phase matching method, a periodic structure for making a quasi phase matching and a waveguide structure for guiding light are generally provided separately from each other, which makes the structure of the element much complicated. However, J. D. Bierlein et al. in Appl. Phys. Lett., 56 (1990), 1725 reported a method in which a polarization-inverted structure is periodically formed in a KTP (KTiOPO$_4$) crystal by ion exchange so that polarization-inverted portions form discrete waveguides. The reported method is simple and provides one of the most practical SHG elements having a quasi phase matching structure. In this method, the condition of phase matching is moderated by using an equilibrium phase matching method in which the inversion of polarization is performed in finely divided segments shorter than the coherence length to obtain a phase matching. Also, this method succeeds in fabrication of one of the efficient elements among the conventional SHG elements for the reason that reflection loss can be made small as a difference of the refractive index of the polarization-inverted portion from that of a non-inverted portion is small and the diffraction loss can be suppressed by making an interval between polarization-inverted portions sufficiently smaller than the Fresnel length.

The above-mentioned element including the combination of the equilibrium phase matching based on the periodic inversion of polarization and the discrete optical waveguides is one of the most practical SHG elements. But, such an element does not suffice for providing a truly practical element so far. In the discrete optical waveguide structure, the diffraction loss is reduced by making the interval between polarization-inverted portions smaller than the Fresnel length. In actual, however, it is not possible to suppress the losses in reflection and diffraction of light caused at interfaces or boundary surfaces to zero. In general, an SHG element is provided with 100 or more discrete structures in the direction of propagation of light. Accordingly, even small losses result in a large cumulative loss as a whole so that effectively available SHG light propagating through the waveguides is reduced, thereby making it difficult to enhance the whole SHG conversion efficiency. Furthermore, since the stray light from each discrete structure diffracts and superimposes on the output light, the output light cannot be converged into one point. In addition, since the interval between polarization-inverted portions cannot freely be selected for the need to reduce the loss, a restriction is imposed on the condition for phase matching and the degree of freedom in designing the structure is therefore low.

Another problem lies in that a very high precision is required for the a waveguide forming process. Generally, in an SHG element having a waveguide structure, a loss at the waveguide greatly depends on the surface precision or profile irregularity of a boundary between a substrate and a light confining region. Therefore, in order to reduce this loss, it is necessary to improve the precision of the boundary surface of the waveguide up to a value which is not larger than a several tenths of the wavelength. Since the existing waveguide forming process relies on a method in which a photomask pattern is transferred to a photoresist film and a portion corresponding to the pattern is subjected to ion exchange or the like, there is a problem that it is difficult to satisfy the requirements for the precision of the boundary surface.

There is a further problem associated with the waveguide structure. Namely, since the SHG conversion efficiency is proportional to the second power of the electric field strength of propagating light, the conversion efficiency is enhanced as the width of the waveguide is made smaller. However, it is difficult to form a narrow waveguide on the order of the wavelength by the actual process.

Further, a harmonic wave generating element using an optical waveguide requires the propagation of light in a single transverse mode in the waveguide in order to enhance the efficiency of conversion into harmonic wave. The width of the optical waveguide required in this case is several μm which is in the order of the wavelength of light. In the case where an incident laser beam is to be converged onto an end surface of the waveguide by use of a lens, it is necessary to make the position of a convergent point coincide with the position of the end surface of the waveguide by the order of μm. Therefore, a high mechanical precision and a high stability are required. However, it is difficult to make the light incident upon the waveguide with high efficiency and the coupling loss of the incident light is large.

Also, a problem common to all of SHG elements using the quasi phase matching system is that tolerance in generating condition of SHG light with high efficiency is very narrow. In general, an allowable wavelength difference is not larger than 0.1 nm in the case of usual light in the range of visible rays to near infrared rays. Accordingly, it is necessary to match the wavelength of incident laser light with the allowable wavelength of the SHG element with a high precision and to stabilize the incident laser light and it is therefore difficult to use a general and low-cost semiconductor laser the output wavelength of which changes depending upon temperature and driving current.

SUMMARY OF THE INVENTION

An object of the present invention is to provide a harmonic wave generating element including the combination of a periodic polarization inversion structure and discrete optical waveguides for solving the above problems which has a reduced scattering loss of light and a high wavelength conversion efficiency, is simple in fabrication process and has an easy design.

Another object of the present invention is to provide a harmonic wave generating element which facilitates the optical coupling to a waveguide and enhances the efficiency of optical coupling.

To solve the above problems, the present invention provides a harmonic wave generating element having polarization-inverted portions and non-inverted portions periodically formed in a non-linear optical material to make quasi phase matching between incident light and an n-th harmonic wave and discrete optical waveguide formed therein, which is characterized in that a boundary between the polarization-inverted portion and the non-inverted portion has a generally curved surface.

In particular, KTP may be used as the non-linear optical material of the harmonic wave generating element having portions of polarization inversion made by exchanging a part of potassium K ions with other metal ions.

Also, the curved surface may be convex in the case where the refractive index of the polarization-inverted portion is higher than that of the non-inverted portion and may be concave in the case where the refractive index of the polarization-inverted portion is lower than that of the non-inverted portion, whereby light is converged in the discrete waveguide.

Further, in order to converge light in the discrete waveguide, there is satisfied the condition of $4*k^2*D^4/(L_1+L_2) \geq f \geq L_1/2$ or $L_1*L_2/2(L_1+L_2) \leq f \leq L_2/2$ in the case of $L_1 \geq L_2$ and $4*k^2*D^4/(L_1+L_2) \geq f \geq L_2/2$ or $L_1*L_2/2(L_1+L_2) \leq f \leq L_1/2$ in the case of $L_2 \geq L_1$, where $L_1$ is the length of the polarization-inverted portion, $L_2$ is the length of the non-inverted portion, f is the focal length of a lens structure formed by the generally curved surface of the boundary between the polarization-inverted portion and the non-inverted portion, k is a propagation constant and D is the width of the optical waveguide.

The present invention also provide a harmonic wave generating element with waveguide structures in which a lens-like light focusing mechanism for coupling incident light to the waveguide is provided at an end surface of incidence of the element.

In particular, the light focusing mechanism is formed by providing a portion of higher refractive index having a convex form for the surrounding so as to function as a lens.

Also, together with the light focusing mechanism mentioned above, a discrete optical waveguide structure is provided formed by inverting the direction of non-linear polarization with respect to the direction of travel of light at a period equal to the coherence length to make a quasi phase matching between the incident light and its harmonic wave and by use of the fact that the refractive index of the polarization-inverted portion is higher than that of the non-linear optical material substrate.

In such a harmonic wave generating element having the waveguide structure and the light focusing mechanism for optical coupling at the end surface of incidence, the light focusing mechanism having a lens function and the optical waveguide for harmonic wave generation can be formed by the same impurity diffusion process.

With the harmonic wave generating element of the present invention, light is converged and the scattering loss of light is reduced, thereby improving the efficiency of conversion.

Also, with the harmonic wave generating element of the present invention, the efficiency of optical coupling of incident light to the harmonic wave generating element is improved and the positional registration of the incident light and the harmonic wave generating element is facilitated so that an allowable wavelength region for SHG conversion is expanded. Therefore, it becomes easy to obtain a short-wavelength laser light source.

DESCRIPTION OF THE PREFERRED EMBODIMENTS

Embodiments of the present invention will be explained by reference to the accompanying drawings.

Figure 2:
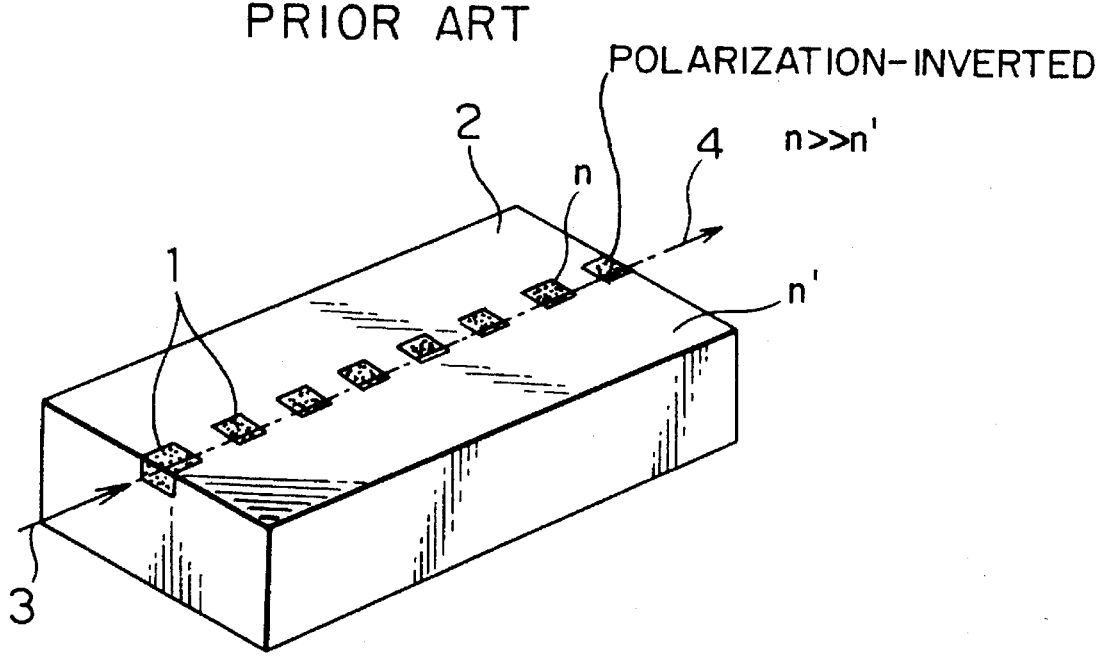
FIG. 2 is a view showing the structure of the conventional SHG element with discrete waveguide structure.
Figures 3A, 3B:
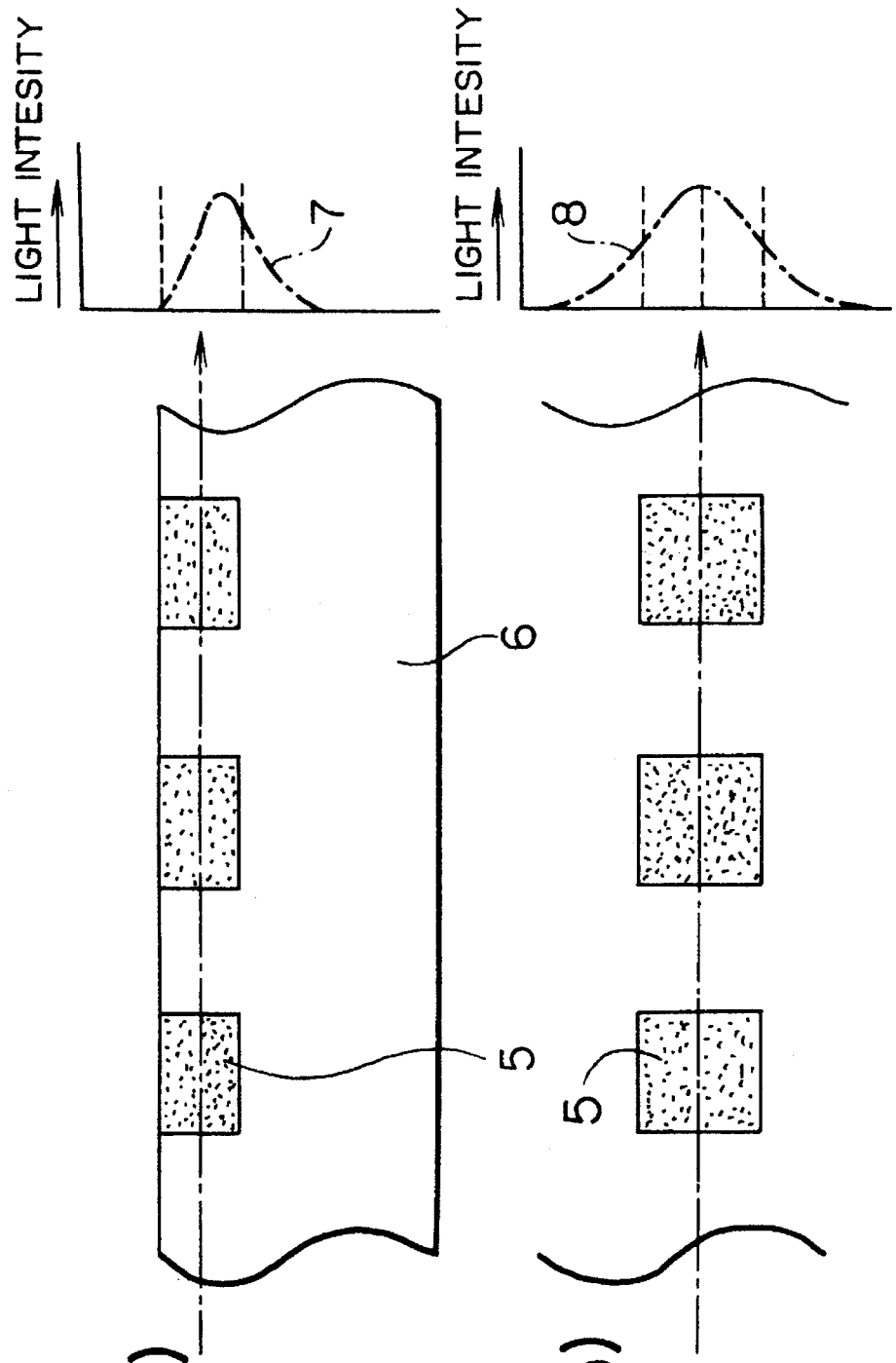
FIGS. 3(a) and 3(b) are schematic diagrams showing the state of propagation of light in the conventional SHG element with discrete waveguide structure.

FIG. 2 shows the conventional SHG element having a discrete waveguide structure. Hatched portions 1 are those portions of a substrate 2 which are polarization-inverted by ion exchange or the like and have a refractive index higher than that of the substrate. Incident light 3 passes through the discrete waveguide structure so that it is converted into SHG light 4. The state of light propagating through such a discrete waveguide structure is shown in FIGS. 3(a) and 3(b). FIG. 3(a) shows a cross section of the substrate as seen from a side direction, and FIG. 3(b) shows a cross section of the substrate when looked down from above. In general, the refractive index of the polarization-inverted portion 5 is higher than that of the substrate 6 by only several percentages. Therefore, the light intensity 7 of the propagating light as seen from the side direction is vertically asymmetric so that the intensity profile considerably extends into the substrate. On the other hand, the light intensity 8 of the propagating light looked at from above extends with a lateral symmetry.

Figure 4:
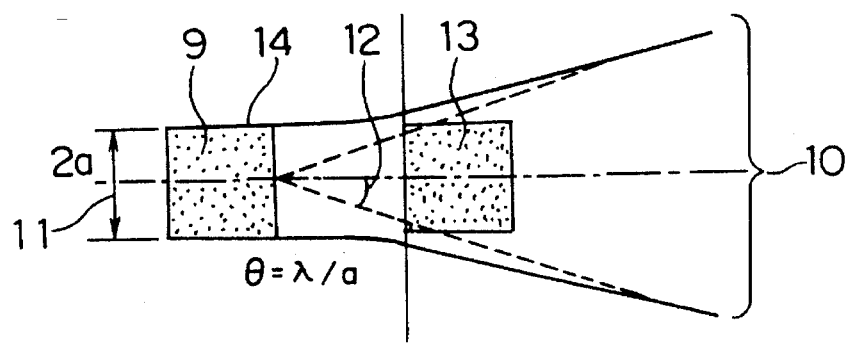
FIG. 4 is a diagram showing the state of generation of the loss of light in an SHG element with discrete waveguide structure.

In an intermediate portion between the polarization-inverted portions, the propagating light is released into the substrate at the boundary portion of the waveguide since the intermediate portion includes no structure for confining the light. FIG. 4 shows the state of spread of such light 10 released from a waveguide 9. Provided that the width 11 of the waveguide is $2a$ and the wavelength of the propagating light is $\lambda$, the light spreads by an angle (12) as expressed with $\theta = \lambda/a$ in a long distance. However, in a short distance portion, especially, in a distance no longer than $a^2/\lambda$ defined as the Fresnel length, the spread of light is small so that most of the light is coupled to the next waveguide structure 13. This is the principle of the discrete waveguide structure. But, it is also apparent from FIG. 4 that a slight excessive spread of light exists even at the distance shorter than the Fresnel length, which results in a loss.

In a boundary surface 14 of the waveguide, the light is confined in the waveguide at a critical angle which is determined by a difference in refractive index between the waveguide and the substrate. Therefore, the roughness of the boundary surface of the waveguide has a direct influence on the loss of light propagating through the waveguide.

Figure 5:
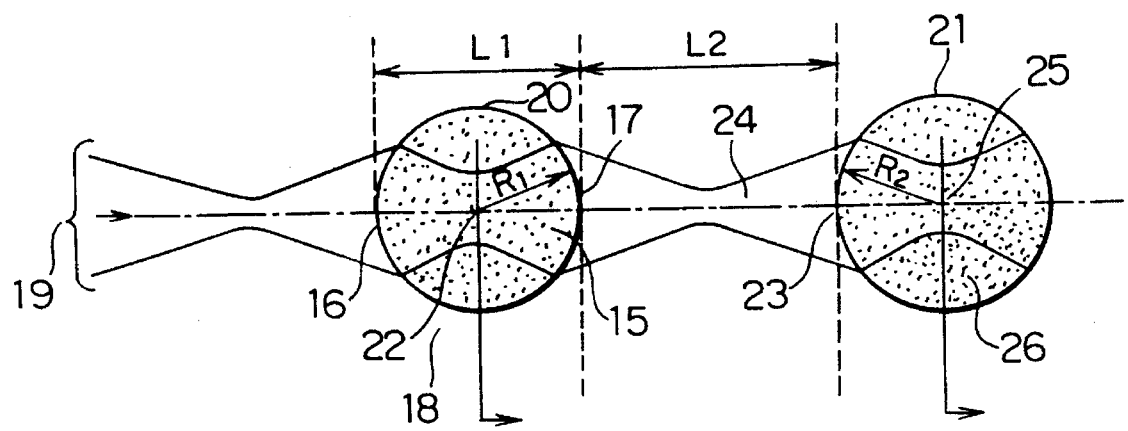
FIG. 5 is a diagram showing the principle of propagation of light in a harmonic wave generating element of the present invention.

The principle of the present invention will now be explained by use of FIG. 5. FIG. 5 is an enlarged top view of periodic elements of a discrete element structure in the present invention. The present invention is characterized in that each of polarization-inverted portions 15 and 26 has boundary portions 16 and 17 which form generally curved surfaces (for example, substantially spherical surfaces) with respect to the direction of propagation of light. The curved surface may be elliptical, parabolic, spherical, cylindrical, and so on. In the case where the refractive index of the polarization-inverted portion 15 or 26 is higher than that of a substrate 18, the curved surface of the boundary portions 16 or 17 is made convex toward the substrate 18, thereby providing an effect that the boundary portion acts as a lens for converging the propagating light 19. Since the polarization-inverted structure is in a periodic arrangement, the light propagates while being converged by a train of convex lenses arranged periodically. Thus, a propagation loss caused by diffraction is reduced in spite of the discrete structure so that the light is confined by the lens structure. As a result, there is obtained an effect that the precision of a side surface 20 or 21 of the waveguide has no influence on the propagation loss.

Now determine a condition with which light is confined in such a convergent waveguide structure. Analysis is made for the state of light propagating through the convergent waveguide structure by using a ray matrix method with an assumption of the Gaussian beam propagation. It is first assumed that the wavefront of light propagating through the waveguide in a central portion 22 of the polarization-inverted portion is P. Provided that focal lengths of lenses formed by spherical structures of the boundary surfaces 17 and 23 between the polarization-inverted portions and a non-inverted portion are respectively $f_1$ and $f_2$ and the lengths of the polarization-inverted portion and the non-inverted portion are $L_1$ and $L_2$, the state change of light while the light at the central position 22 of the polarization-inverted portion propagates and reaches the corresponding position 25 of the next polarization-inverted portion can be calculated by the ray matrix method.

A ray matrix [M] associated with the propagation is given by the following expression (1):

$$[M] = \begin{bmatrix} M_{11}, & M_{12} \\ M_{21}, & M_{22} \end{bmatrix} \quad (1)$$

$$= \begin{bmatrix} 1, & 0 \\ jL_1/2k_1, & 1 \end{bmatrix} \begin{bmatrix} 1, & jk_2/f_1 \\ 0, & 1 \end{bmatrix} \begin{bmatrix} 1, & 0 \\ jL_2/k_2, & 1 \end{bmatrix} \times$$

$$\begin{bmatrix} 1, & jk_1/f_2 \\ 0, & 1 \end{bmatrix} \begin{bmatrix} 1, & 0 \\ jL_1/2k_1, & 1 \end{bmatrix}.$$

The matrices of the right side of the expression (1) represent propagation in the polarization-inverted portion 15, refraction at the spherical surface 17, propagation in the non-inverted portion 24, refraction at the spherical surface 23, and propagation in the polarization-inverted portion 26, respectively. Here, $k_1$ and $k_2$ are the propagation coefficients of light in the polarization-inverted and non-inverted portions, respectively. Provided that the refractive indices of the polarization-inverted and non-inverted portions are respectively $n_1$ and $n_2$, the propagation coefficients $k_1$ and $k_2$ are represented by the following expression:

$$k_1 = 2\pi n_1/\lambda, \ k_2 = 2\pi n_2/\lambda.$$

A wavefront at the end point 25 of propagation with respect to the wavefront P at the starting point 22 is given by the following expression:

$$(M_{11}*P + M_{12})/(M_{21}*P + M_{22}). \quad (2)$$

If the wavefront following the expression (2) becomes a plane wave equal to the original wavefront P, the light is confined in the periodic lens structure so that it propagates with no diffraction loss.

Next, a method of approximately determining the value of f in a relatively simple manner is described.

Provided that the radii of curvature of curved surfaces providing the boundaries between the polarization-inverted portions and the non-inverted portion are $R_1$ and $R_2$, $f_1$ and $f_2$ are given by $$\begin{aligned} f_1 &= \{n_2/(n_1 - n_2)\}*R_1, \\ f_2 &= \{n_1/(n_1 - n_2)\}*R_2 \end{aligned} \quad (3)$$

based on a general equation of geometric optics.

The change of refractive index caused by polarization inversion for making the quasi phase matching of SHG is very small since the polarization inversion is generally carried out by ion exchange. Therefore, $n_1 \approx n_2$. Provided that the polarization-inverted portion has a symmetric structure and hence $R_1 = R_2 = R$, the use of $f_1 \approx f_2 = f$ and $k_1 \approx k_2$ provides $M_{11} = M_{12}$. Also, a spot diameters at the center of the polarization-inverted portion in this case is given by $$\begin{aligned} S^2 &= 1/P \\ &= \sqrt{M_{21}/M_{12}} \\ &= \frac{\sqrt{L_1 + L_2}}{2k} \times \sqrt{\frac{(f - L_1/2)(f - L_1*L_2/(L_1 + L_2))}{(f - L_2/2)}} \end{aligned} \quad (4)$$

From the expression (4), a condition for the existence of a significant spot diameter is $$(f - L_1/2)*(f - L_2/2)*(f - L_1*L_2/2(L_1 + L_2)) \geq 0. \quad (5)$$

Thereby, the following is given: in the case of $L_1 > L_2$, $$\left.\begin{aligned} &f \geq L_1/2 \text{ or } L_2/2 \geq f \geq L_1 * L_2/2(L_1 + L_2) \\ &\text{and;} \\ &\text{in the case of } L_2 > L_1, \\ &f \geq L_2/2 \text{ or } L_1/2 \geq f \geq L_1 * L_2/2(L_1 + L_2). \end{aligned}\right\} \quad (6)$$

In the case where a difference between $n_1$ and $n_2$ is small, the condition of $f > L_1/2$, $L_2/2$ is satisfied from the expression (3). In this case, the expression (4) is represented by $$S^2 = \sqrt{(L_1 + L_2)*f} \ /2k. \quad (7)$$

Another condition with which light propagates with no loss is that the spot diameter S of the propagating light is narrower than the width D of the optical waveguide. Thus, the following condition is derived from the expression (7):

$$D^4*4k^2/(L_1+L_2) > f. \quad (8)$$

The expressions (6) and (8) are conditions with which light propagates through the SHG element of the present invention having the discrete optical waveguide structure.

Subsequently, a first embodiment of the structure of an element according to the present invention will be explained by use of FIG. 1. A Z-plate of KTP monocystal is used as a substrate 27. Cylindrical polarization-inverted portions 29 are formed from a Z surface 28 side by an ion exchange technique. Though it is preferable that the boundary surface of the polarization-inverted portion is a spherical surface with respect to the direction of propagation of light, there is employed, for the sake of simplicity, a cylindrical form in which the curvature is infinitely great in a direction perpendicular to the Z surface and the curvature is provided only in the Z surface direction. In this case, the expression (8) cannot be satisfied in the direction perpendicular to the Z surface but the reduction in loss is made only in the Z surface direction by using the condition with which the expressions (6) and (8) are satisfied.

Figure 1:
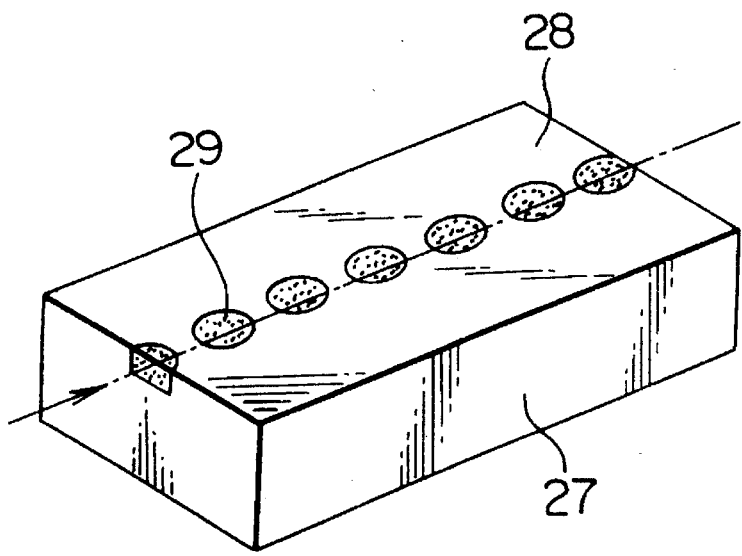
FIG. 1 is a view showing the structure of a harmonic wave generating element according to a first embodiment of the present invention.
Figure 6:
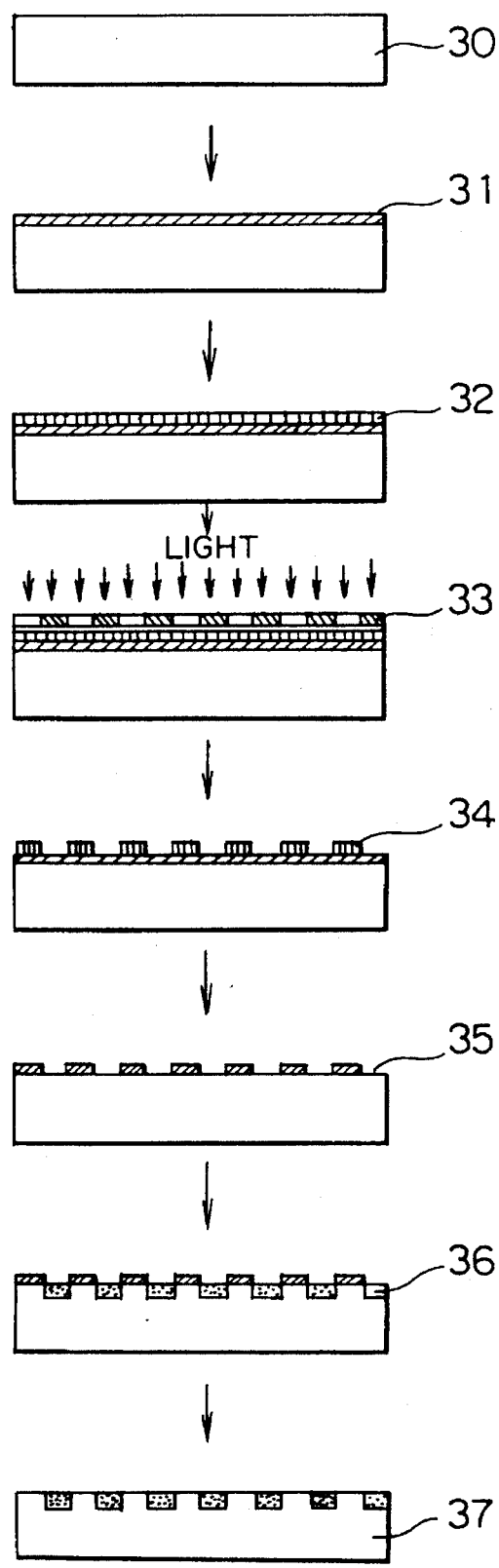
FIG. 6 is views showing a process for fabrication of the element of the embodiment of the present invention.

FIG. 6 shows a method for fabrication of the element of the first embodiment shown in FIG. 1. A thin film 31 of Ti is formed on the Z surface of a KTP substrate 30. Next, the Ti film 31 is coated with a photoresist film 32. The photoresist film 32 is exposed by use of a photomask 33 having a form of polarization-inverted portions and is then developed to form a photoresist pattern 34. Further, a Ti pattern 35 is formed through a chemical etching process. The resultant structure is subjected to a heat treatment in a mixed solution of $Ba(NO_3)_2$ and $RbNO_3$ so that a part of K ions of KTP is replaced by rubidium Rb, thereby forming a polarization-inverted structure 36. The thin Ti film is removed to complete the element 37.

The dimension and refractive index of each portion in the first embodiment shown in FIG. 1 are shown in Table 1. In the shown example, a circular form is used as the pattern of polarization-inverted portion for simplicity of the process.

TABLE 1

| PORTION | VALUE |
| --- | --- |
| $L_1 = 2*R$ | 3 μm |
| $L_2$ | 1.5 μm |
| $D = 2*R$ | 3 μm |
| R | 1.5 μm |
| $n_1$ | 1.7644 ($\lambda = 1.06$ μm), 1.8042 (0.53 μm) |
| $n_2$ | 1.7399 ($\lambda = 1.06$ μm), 1.7790 (0.53 μm) |

The state of propagation of light with wavelength of 1.06 μm and SHG light of 0.53 μm under such conditions will be shown.

For the wavelength of 1.06 μm, f is 108 μm in accordance with the expression (3) and then k is obtained as 10 μm$^{-1}$. As the condition of the expression (6), $f > L_1/2 = 1.5$ μm is satisfied in the case of $L_1 > L_2$. Also, $D^4*4k^2/(L_1+L_2) = 7862$ μm $> f$ is satisfied as the condition of the expression (8). The spot diameter S of propagating light in this case is 1 μm according to the expression (7).

Similarly, conditions satisfying the expressions (6) and (8) exist for SHG light.

Figure 7A:
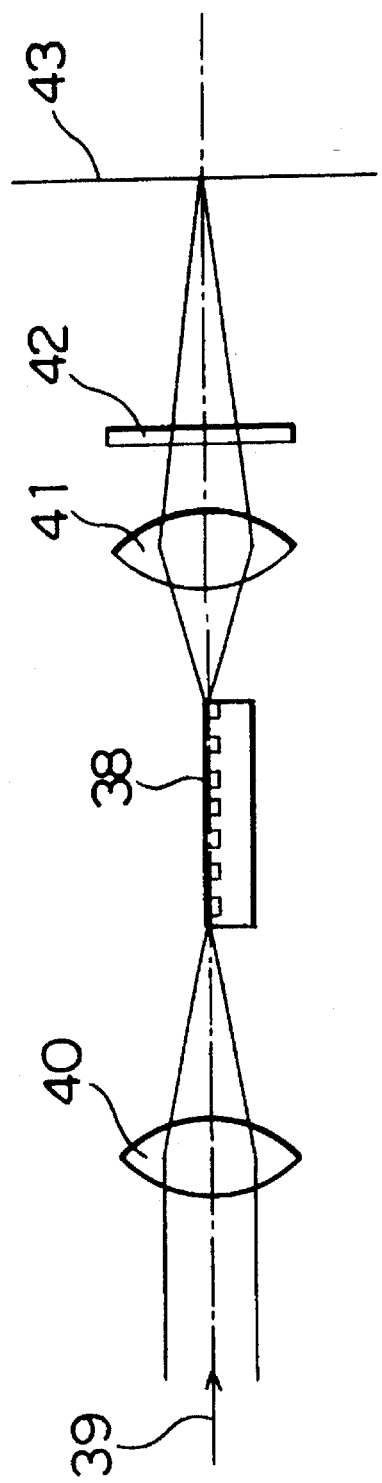
FIG. 7A is a diagram showing an SHG generating device using the SHG element of the embodiment of the present invention.
Figures 7B, 7C:
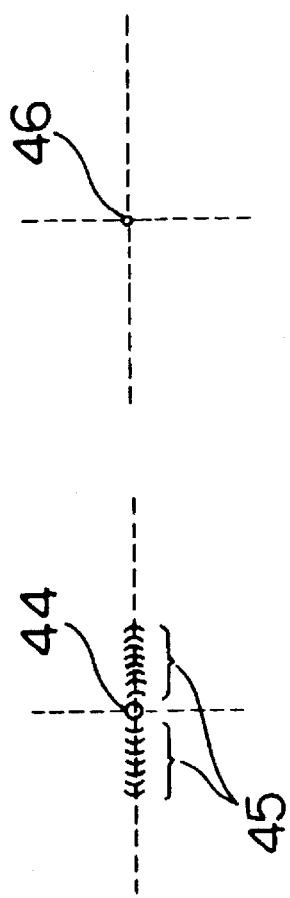
FIG. 7B is a diagram showing the state of convergence of SHG light obtained by the conventional SHG element.
FIG. 7C is a diagram showing the state of convergence of SHG light obtained by the SHG element of the present embodiment.

A device for obtaining an SHG light output in the element of the first embodiment shown in FIG. 1 and the results are shown in FIGS. 7A, 7B and 7C. FIG. 7A shows a measuring system. Output light 39 with a wavelength of 1.06 μm from a YAG laser is converged onto an SHG element 38 through a lens 40. Output light from the SHG element 38 is projected onto a screen 43 through a lens 41 and a filter 42 which cuts off 1.06 μm and transmits 0.53 μm. Comparative experiments were made for an element which had the conventional rectangular structure and an element which had the structure of FIG. 1 according to the first embodiment of the present invention, both elements having the same basic dimensions.

FIG. 7B shows a pattern on the screen obtained by the element having the conventional structure, and FIG. 7C shows a pattern on the screen obtained by the element having the structure of the present invention. In the conventional structure, scattered light 45 from each polarization-inverted structure was observed around a converged spot 44. In the structure of the present invention, on the other hand, only a spot 46 was obtained. Also, the efficiency of conversion from incident light to SHG light obtained in the structure of the present invention was about 10 or more times as high as that in the conventional structure.

In the present embodiment, KTP is used for the substrate. However, it is possible to use lithium niobate or lithium tantalate which is a non-linear optical material. Also, an organic non-linear material may be used.

In the first embodiment of the present invention, the periodic polarization inversion structure is used to perform quasi phase matching between incident light and SHG light. However, a structure for making the quasi phase matching by only a periodic change in refractive index without the polarization inversion may be used with a similar convergent waveguide structure to obtain a high-efficiency harmonic wave generating element for SHG, third harmonic THG or the like.

In the present embodiment, a generally cylindrical surface has been formed as the boundary portion of polarization inversion. However, a material such as lithium tantalate having a different condition of ion exchange for polarization inversion may be used to form a spherical surface, thereby obtaining an element which has a higher efficiency.

Figure 9:
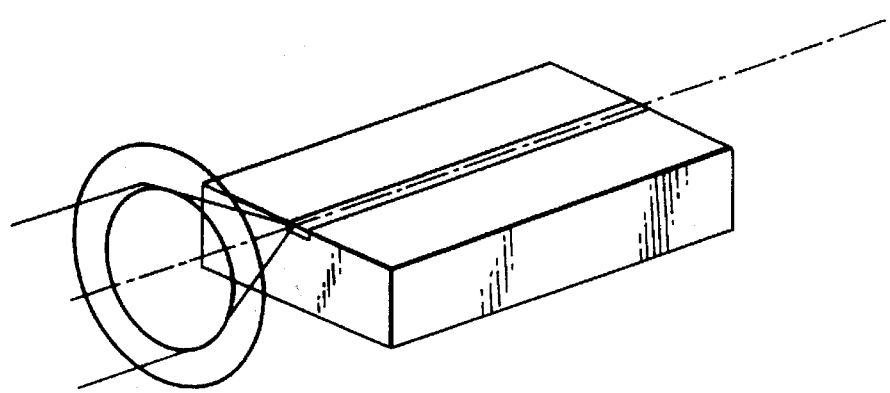
FIG. 9 is a view showing the conventional waveguide SHC element.
Figure 10:
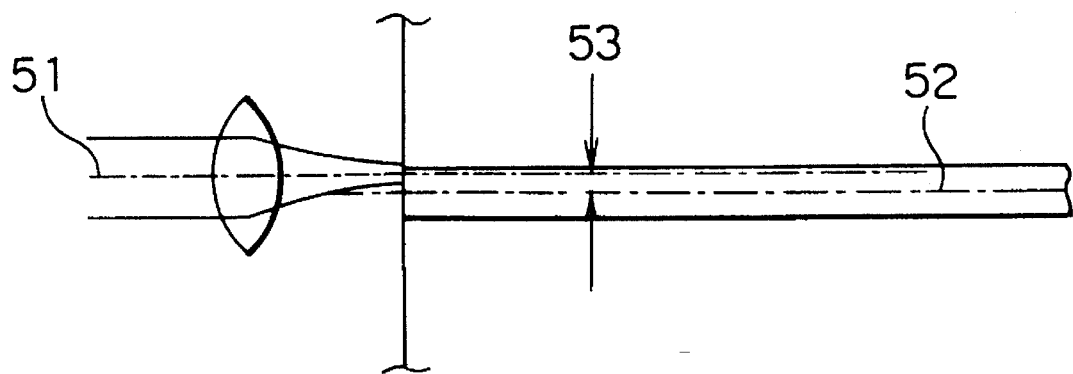
FIG. 10 is an enlarged view of the conventional waveguide SHC element in the vicinity of an end surface of incidence.

FIG. 9 shows the state of optical coupling to the conventional waveguide SHG element. FIG. 10 shows in an enlarged form the state of optical coupling in the vicinity of an end surface of incidence of the conventional waveguide SHG element. A deviation 53 of the optical axis 51 of incident light from the optical axis 52 of a waveguide results in a coupling loss. Detailed examinations of the relations of increase in loss to such a deviation of optical axes in optical couplings have theoretically been made in conjunction with the exemplified cases of connection of optical fibers and so on. For example, as shown on page 226 of Hikari Tsushin Yoran (Optical Communication Handbook) edited by Hiroshi HIRAYAMA et al. and published by Kagaku Shinbun-sha on 1984, the axial deviation of ⅓ for the width of a waveguide results in a loss which exceeds 1 dB. In other words, in the case of a single transverse mode waveguide as in an SHG element, since the width of the waveguide is in the order of several μm, a limit on axial deviation is also in the order of several μm and a very high-precision positioning mechanism is therefore required.

Figure 8:
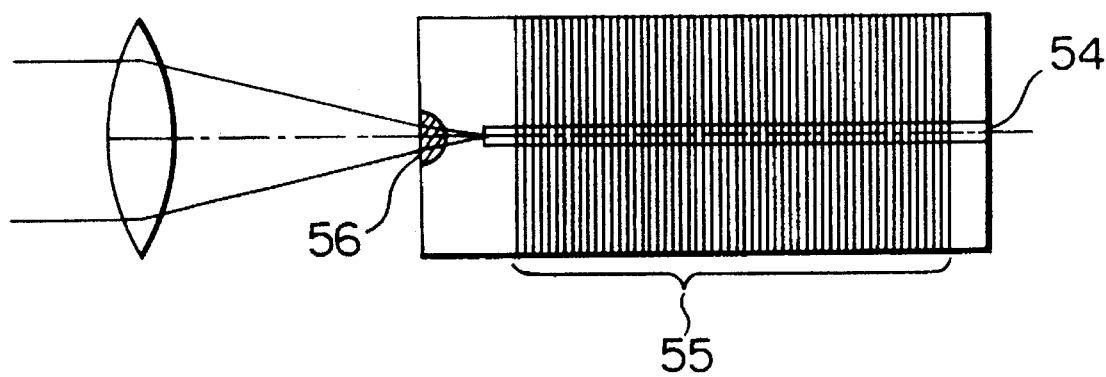
FIG. 8 is a view showing a second embodiment of the present invention.

A second embodiment of the present invention will be explained by use of FIG. 8. An SHG element is provided with an optical waveguide 54 formed in a portion excepting an end surface portion of incidence and with a periodic polarization inversion structure 55 for phase matching. A substrate of the SHG element is formed with KTP. The phase inversion structure is formed in such a manner that a heat treatment is carried out in a mixed solution of $RbNO_3$ and $Ba(NO_3)_2$ so that K ions in the KTP substrate are replaced by Rb ions and barium Ba are diffused in the substrate as impurities. The waveguide structure is formed by carrying out a heat treatment with only $RbNO_3$ to replace K by Rb so that only the refractive index is increased. An optical coupling portion at the end surface includes a lens-like structure formed by implanting N ions in a shape of spherical semicircular to increase the refractive index.

Figure 11:
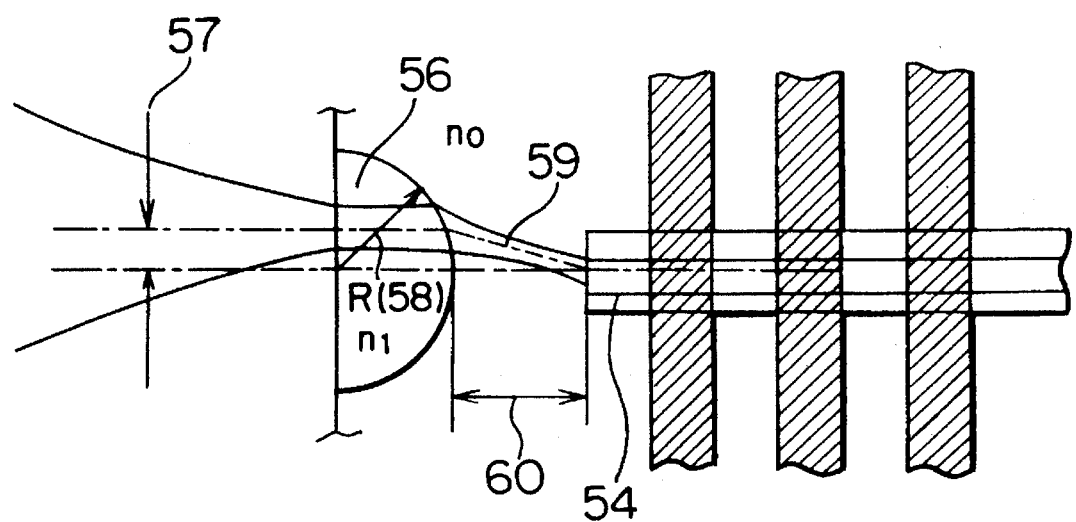
FIG. 11 is an enlarged view of the second embodiment in the vicinity of an end surface of incidence.

FIG. 11 shows an enlarged view of the end surface portion of the element in the second embodiment of the present invention. Provided that the focal distance of the lens-like structure formed by the optical coupling portion 56 is f, incident light from the end surface is all focused onto one point at the focal distance f. Provided that the refractive indices of the substrate and the optical coupling portion 56 are respectively $n_0$ and $n_1$ and the radius 58 of curvature of the optical coupling portion is R, the focal distance f of the lens formed by the optical coupling portion 56 is $$f=\{n_1/(n_1-n_0)\} * R. \tag{10}$$

By making a distance 60 between the optical waveguide 54 and the optical coupling portion 56 substantially equal to the above focal distance f, incident light is conducted to the optical waveguide 54 in accordance with an optical axis 59 by virtue of the lens effect of the optical coupling portion 56 even in the case where an optical axis of the incident light has a deviation 57 from an optical axis of the waveguide.

Figure 12:
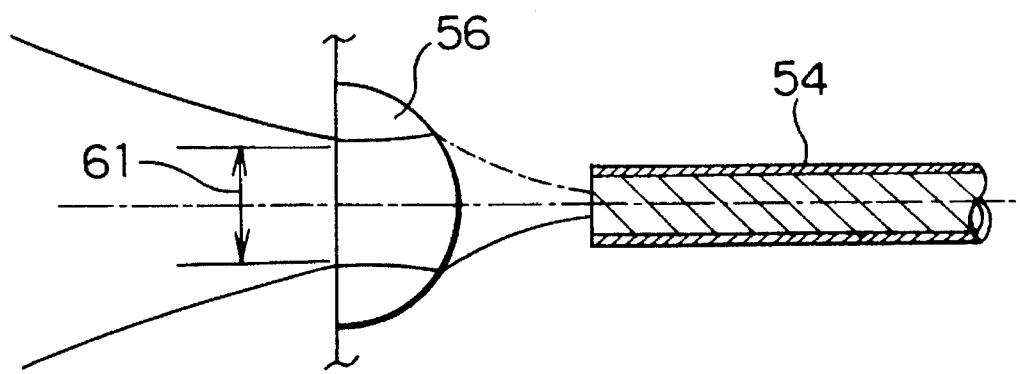
FIG. 12 is a view showing the case where in the second embodiment, the beam diameter of incident light is larger than the width of a waveguide.

Also, even in the case where incident light has a beam diameter 61 larger than the width of the waveguide, as shown in FIG. 12, it is possible to conduct the incident light to the optical waveguide 54 with a high efficiency by virtue of the lens effect of the optical coupling portion 56. Accordingly, the end surface portion 56 is useful even in an optical waveguide structure which is not of the discrete type.

Figure 13:
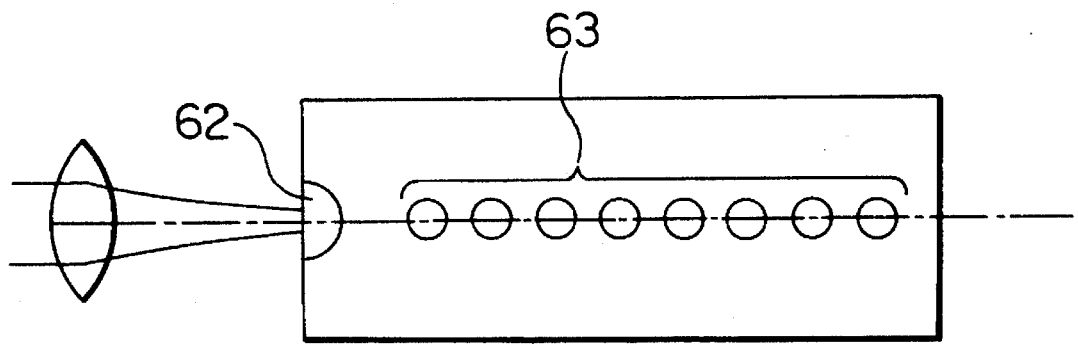
FIG. 13 is a view showing a third embodiment.

FIG. 13 shows a third embodiment of the present invention. An optical waveguide portion of a harmonic wave generating element in the present embodiment is similar to the optical waveguide in the first embodiment shown in FIG. 1. Namely, in the quasi phase matching harmonic wave generating element having the discrete waveguide, the convergence of light propagating through the waveguide and the generation of harmonic wave at a high efficiency become possible by providing the boundary of the polarization-inverted portion with a generally curved surface.

As in the second embodiment, KTP is used for a substrate, and an optical coupling portion 62 and a portion 63 functioning as both optical waveguide and quasi phase matching are formed by replacing a part of ions by other kind of ions.

In the present embodiment, the waveguide itself has a function of converging light. Accordingly, there is no need to make a distance between the optical coupling portion 62 and the optical waveguide 63 accurately corresponding to the focal distance of a lens structure formed by the optical coupling portion 62.

Figure 14:
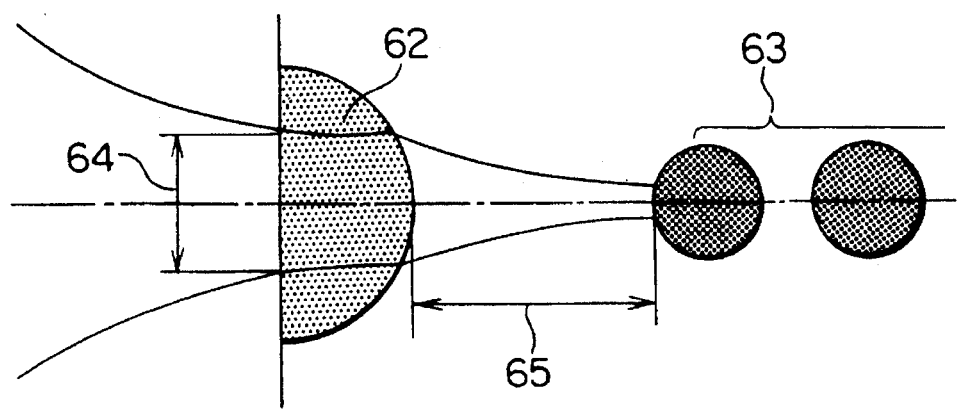
FIG. 14 is a view showing the case where in the third embodiment, the beam diameter of incident light is large.

However, as shown in FIG. 14, the focal distance of a lens structure formed by the optical coupling portion 62 and the distance 65 between the optical coupling portion 62 and the optical waveguide 63 are made substantially equal to each other, as in the second embodiment, in order to permit a very large diameter 64 of incident light and a large axial deviation.

Figure 15:
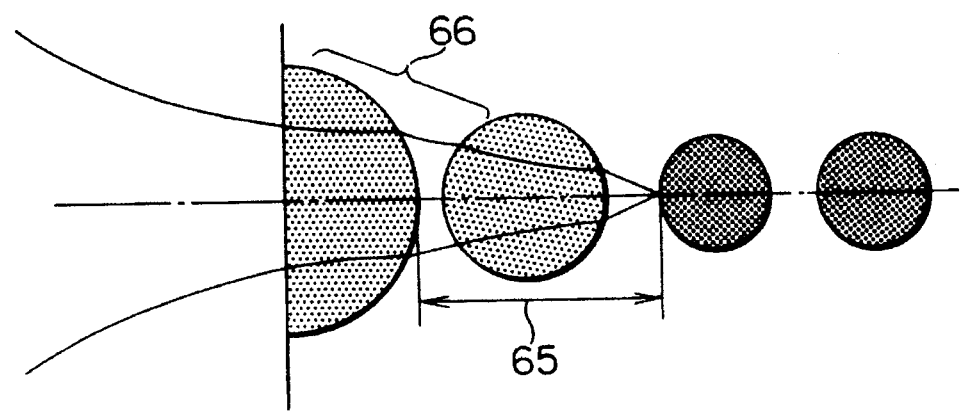
FIG. 15 is a view showing a fourth embodiment.

A fourth embodiment of the present invention is shown in FIG. 15. In this embodiment, the structure of an optical coupling portion includes a plural-lens structure 66. In the case where a large axial deviation is to be permitted, as shown in FIG. 14 in conjunction with the third embodiment, it is necessary to make long the whole length of the element since a necessary distance 65 from the waveguide becomes large. In the present embodiment, the optical coupling portion is made substantially short by virtue of the plural-lens structure.

Figure 16:
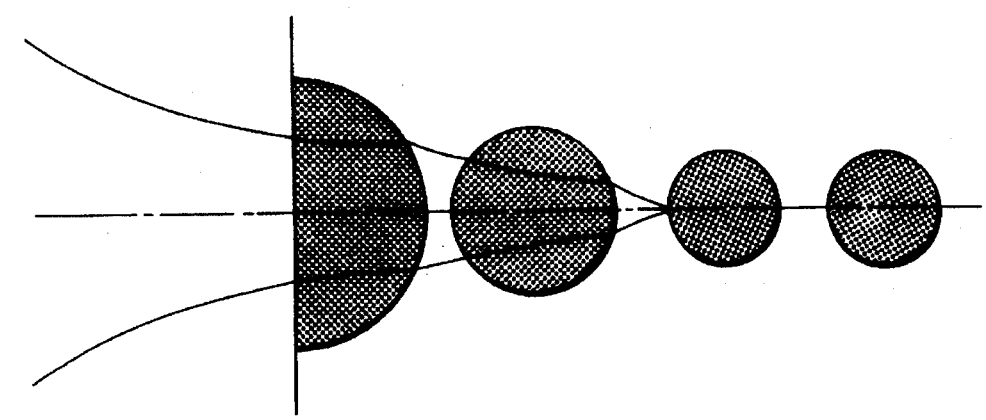
FIG. 16 is a view showing a fifth embodiment.

A fifth embodiment of the present invention is shown in FIG. 16. In the second, third and fourth embodiments, the change in refractive index of the optical coupling portion and the polarization-inverted portion are attained by the replacement of different materials. In the present embodiment, the optical coupling portion and the phase inversion portion are attained by the same ion replacement process using the same material. Though FIG. 16 shows an example in the case where the application is made in place of the fourth embodiment, a similar procedure is also applicable to the third embodiment. In the case where the optical coupling portion 56 or 62 as mentioned above is used, it is possible to use a low-cost laser since an allowable wavelength for SHG conversion is expanded.

Figure 17:
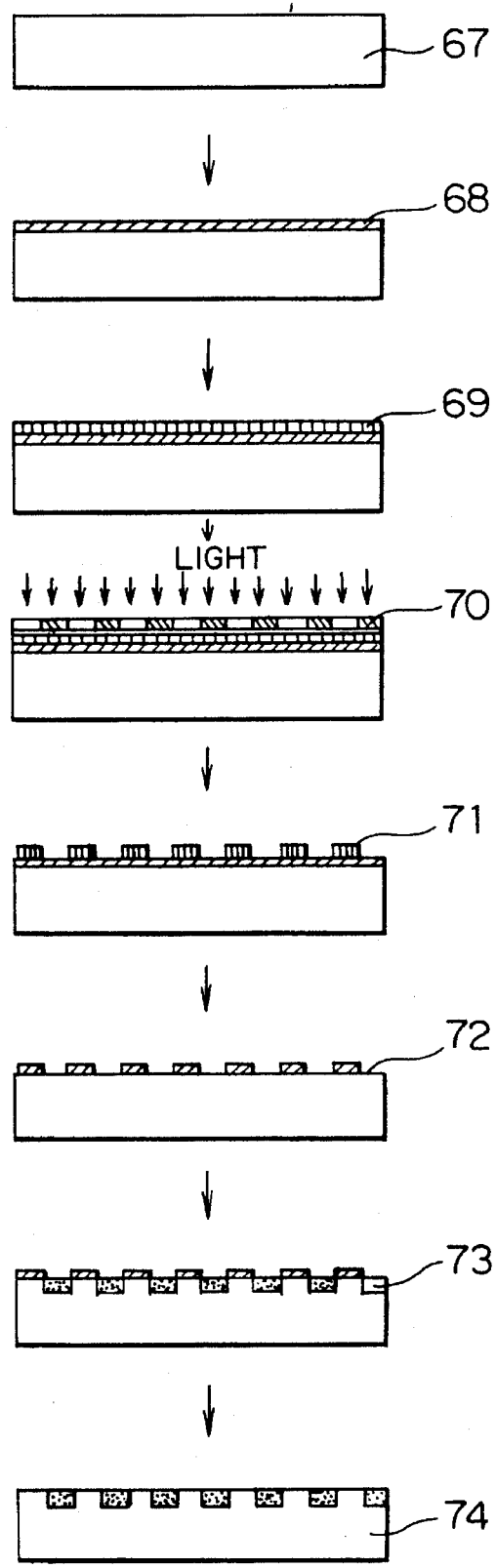
FIG. 17 is views showing a process for fabrication of the SHG element of the fifth embodiment.

FIG. 17 shows the outline of an element fabricating process for the fifth embodiment of FIG. 16 among the foregoing embodiments. This process is substantially similar to the process for the first embodiment shown in FIG. 6. Namely, a thin film 68 of Ti is first formed on the Z surface of a KTP substrate 67. Next, the Ti film 68 is coated with a photoresist film 69. The photoresist film 69 is exposed by use of a photomask 70 having a form of polarization-inverted portions and is then developed to form a photoresist pattern 71. Further, a pattern 72 is formed on the Ti film through a chemical etching process. The resultant structure is subjected to a heat treatment in a mixed solution of $Ba(NO_3)_2$ and $RbNO_3$ so that a part of K ions of KTP is replaced by Rb, thereby forming a polarization-inverted structure 73. The Ti film is removed to complete the element 74.

The pattern is such that the diameter of 3 μm and the center-to-center distance of 4.5 μm are provided for the polarization-inverted portion and a lens structure in a semi-circular form having the diameter of 6 μm is provided only for the end surface of incidence.

Figure 18A:
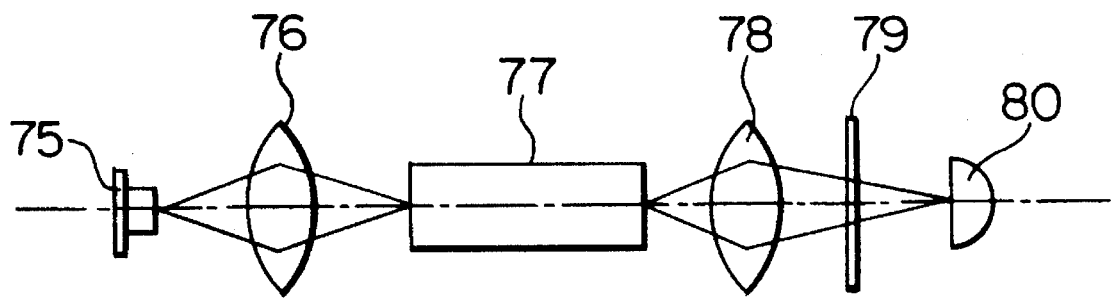
FIG. 18A is a diagram showing a device for measuring the efficiency of SHG conversion for an axial deviation between focused light and a waveguide in the fifth embodiment.
Figure 18B:
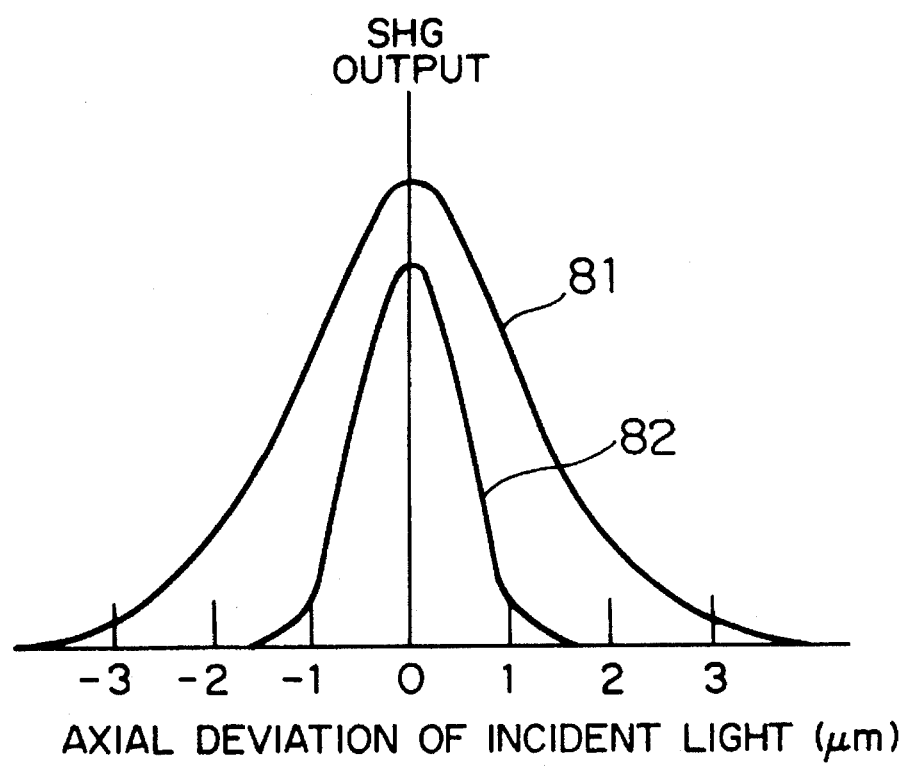
FIG. 18B is a diagram showing the results of measurement.

FIG. 18A shows an experimental system for measuring the efficiency of optical coupling in the embodiments of the present invention. Output light from a wavelength-stabilized semiconductor laser 75 is focused onto an SHG element 77 by a lens 76. Output light from the SHG element is converged by a lens 78 and passes through an optical filter 79 which does not transmit a fundamental wave but transmits the SHG wave. The output light is focused onto a photo detector 80. The measurement of the output light of the SHG element was made with an axial deviation being adjusted by causing the small movement of the SHG element in a direction perpendicular to the optical axis. It is seen from FIG. 18B that a tolerance 81 of the element of the present embodiment for axial deviation is expanded as compared with that shown as 82 for the conventional element having no optical coupling structure at an end portion and the coupling efficiency in the case of the former element is improved as compared with that in the case of the latter element.

According to the present invention as has been explained in the foregoing, it becomes possible to obtain a high-efficiency harmonic wave generating element in which the problems of low conversion efficiency, non-convergence of light, and so on involved in connection with the harmonic wave generating element having the conventional discrete polarization inversion structure are solved. Also, the combination of the harmonic wave generating element according to the present invention with a semiconductor laser can provide a small-size and low-cost light source for wavelengths in the range of blue to green the realization of which was difficult in the prior art.

Further, the present invention makes it possible to easily obtain a short-wavelength light source for the range from green to blue in which the problems of high mechanical precision for optical coupling and a low efficiency of optical coupling are solved and a high efficiency is provided by combining the harmonic wave generating element according to the present invention with a semiconductor laser.

We claim:

1. A harmonic wave generating element for converting coherent incident light into an n-th harmonic wave which has a wavelength equal to or shorter than one half of the wavelength of the incident light, comprising:

a non-linear optical material having an end surface to which the incident light is applied, and an upper surface perpendicular to the end surface;

a plurality of polarization-inverted portions formed periodically along a propagation direction of the incident light in the non-linear optical material with any upper surface of the polarization-inverted portion is exposed on the upper surface of the non-linear optical material, one of the polarization-inverted portions being formed at the end surface of the non-linear optical material; and a plurality of polarization-non-inverted portions arranged between the adjacent polarization-inverted portions, each of the polarization-non-inverted portions having a refractive index different from a refractive index of the polarization-inverted portion;

said polarization-inverted portions and the polarization-non-inverted portions forming a discrete optical waveguide; and wherein any boundary line on the upper surface of the non-linear optical material between the polarization-inverted portion and the polarization-non-inverted portion is curved.

2. A harmonic wave generating element according to claim 1, wherein the non-linear optical material is KTP ($KTiOPO_4$) and the polarization-inverted portions are formed by replacing a part of potassium ions in KTP with other metal ions.

3. A harmonic wave generating element according to claim 1, wherein each of the boundary lines is convex toward the polarization-non-inverted portion in the case where the refractive index of the polarization-inverted portion is higher than the refractive index of the polarization-non-inverted portion;

each of the boundary lines is concave toward the polarization-non-inverted portion in the case where the refractive index of the polarization-inverted portion is lower than the refractive index of the polarization-non-inverted portion; and wherein a condition is satisfied with which light propagating in the discrete waveguide is converged.

4. A harmonic wave generating element according to claim 3, wherein said condition is $$4*k^2*D^4/(L_1+L_2) \geq f \geq L_1/2 \text{ or}$$

$$L_1*L_2/2(L_1+L_2) \leq f \leq L_2/2$$

in the case of $L_1 \geq L_2$ and $$4*k^2*D^4/(L_1+L_2) \geq f \geq L_2/2 \text{ or}$$

$$L_1*L_2/2(L_1+L_2) \leq f \leq L_1/2$$

in the case of $L_2 \geq L_1$, wherein $L_1$ is a length of the polarization-inverted portion in a light guiding direction, $L_2$ is a space between the adjacent polarization-inverted portions in the light guiding direction, f is a focal length of a lens structure formed by the polarization-inverted portion with the curved boundary line, k is a propagation constant of light in the nonlinear optical material, and D is a width of the polarization-inverted portion.

5. A harmonic wave generating element for converting coherent incident light into an n-th harmonic wave which has a wavelength equal to or shorter than one half of the wavelength of the incident light, comprising:

a non-linear optical material having an end surface to which the incident light is applied, and an upper surface perpendicular to the end surface;

an optical waveguide structure for converting the incident light into the n-th harmonic wave; and a lens-like light focusing mechanism having a refractive index different from a refractive index of the non-linear optical material; wherein the optical waveguide structure is formed along a propagation direction of the incident light in the non-linear optical material except for the vicinity of the end surface; and the lens-like light focusing mechanism is formed at the end surface of the non-linear optical material with an upper surface of the lens-like light focusing mechanism is exposed on the upper surface of the non-linear optical material, and a boundary line on the upper surface of the non-linear optical material between the lens-like light focusing mechanism and the non-linear optical material being curved so as to optically couple the incident light to the optical waveguide structure.

6. A harmonic wave generating element according to claim 5, wherein the boundary line is convex toward the non-linear optical material in the case where the refractive index of the lens-like light focusing mechanism is higher than the refractive index of the non-linear optical material; and the boundary line is concave toward the non-linear optical material in the case where the refractive index of the lens-like light focusing mechanism is lower than the refractive index of the non-linear optical material.

7. A harmonic wave generating element for converting coherent incident light into an n-th harmonic wave which has a wavelength equal to or shorter than one half of the wavelength of the incident light, comprising:

a non-linear optical material having an end surface to which the incident light is applied and an upper surface perpendicular to the end surface;

a plurality of polarization-inverted portions formed periodically along a propagation direction of the incident light in the non-linear optical material except for the vicinity of the end surface of the non-linear optical material so that any upper surface of the polarization-inverted portion is exposed on the upper surface of the non-linear optical material;

a plurality of polarization-non-inverted portions arranged between the adjacent polarization-inverted portions, each of the polarization-non-inverted portions having a refractive index different from a refractive index of the polarization-inverted portion; and a lens-like light focusing mechanism formed at the end surface of the non-linear optical material with an upper surface of the lens-like light focusing mechanism being exposed on the upper surface of the non-linear optical material, and having a refractive index different from a refractive index of the non-linear optical material;

said polarization-inverted portions and said polarization-non- inverted portions forming a discrete optical waveguide; wherein any boundary line on the upper surface of the non-linear optical material between the polarization-inverted portion and the polarization-non-inverted portion is curved; and a boundary line on the upper surface of the non-linear optical material between the lens-like light focusing mechanism and the non-linear optical material is curved so as to optically couple the incident light to the discrete optical waveguide.

8. A harmonic wave generating element according to claim 7, wherein any polarization-inverted portion and the lens-like light focusing mechanism are formed by replacing a part of the non-linear optical material by another material from the upper surface of the non-linear optical material or by diffusing another material as impurity from the upper surface of the nonlinear optical material.

9. A harmonic wave generating element according to claim 7 further comprising another lens-like light focusing mechanism formed between the lens-like light focusing mechanism and the discrete optical waveguide with an upper surface of said another lens-like light focusing mechanism being exposed on the upper surface of the non-linear optical material, and having a refractive index different from the refractive index of the non-linear optical material; and wherein said another lens-like light focusing mechanism has a curved boundary line on the upper surface of the non-linear optical material so as to optically couple the incident light from the lens-like light focusing mechanism to the discrete optical waveguide.

* * * * *